(12) United States Patent
Frolov

(10) Patent No.: US 8,770,074 B2
(45) Date of Patent: Jul. 8, 2014

(54) POWER SAW HAVING A DUST CLEANING SYSTEM

(75) Inventor: Andrew Frolov, Glenview, IL (US)

(73) Assignee: Robert Bosch GmbH, Stuttgart (DE)

( * ) Notice: Subject to any disclaimer, the term of this patent is extended or adjusted under 35 U.S.C. 154(b) by 561 days.

(21) Appl. No.: 12/652,822

(22) Filed: Jan. 6, 2010

(65) Prior Publication Data

US 2011/0162500 A1    Jul. 7, 2011

(51) Int. Cl.
*B27B 5/29*      (2006.01)
*B27B 5/16*      (2006.01)

(52) U.S. Cl.
USPC ........................... 83/100; 83/477.2; 144/252.1

(58) Field of Classification Search
USPC .......... 83/98, 100, 168–170, 477–477.2, 581;
144/252.1; 15/301, 347, 352, 327.1;
451/453, 456
See application file for complete search history.

(56) References Cited

U.S. PATENT DOCUMENTS

| | | | |
|---|---|---|---|
| 3,322,169 A | | 5/1967 | Hilliard |
| 3,511,322 A | * | 5/1970 | Holman et al. ................. 173/75 |
| 4,063,478 A | * | 12/1977 | Stuy ............................... 83/100 |
| 4,241,505 A | * | 12/1980 | Bodycomb et al. ............. 30/390 |
| 4,255,995 A | * | 3/1981 | Connor ........................... 83/100 |
| 4,300,426 A | * | 11/1981 | Weaver ........................ 83/471.3 |
| 4,721,023 A | * | 1/1988 | Bartlett et al. ................... 83/100 |
| 4,788,769 A | * | 12/1988 | Maruyama ....................... 30/133 |
| 4,899,442 A | * | 2/1990 | Horii et al. ....................... 30/133 |
| 5,123,317 A | * | 6/1992 | Barnes et al. ..................... 83/98 |
| 5,158,001 A | | 10/1992 | Udelhofen et al. |
| 5,857,507 A | | 1/1999 | Puzio et al. |
| 5,878,607 A | * | 3/1999 | Nunes et al. ..................... 30/124 |
| 6,009,782 A | * | 1/2000 | Tajima et al. ...................... 83/99 |
| 6,431,040 B1 | | 8/2002 | Miller et al. |
| 6,530,303 B1 | * | 3/2003 | Parks et al. ..................... 83/473 |
| 6,546,835 B2 | * | 4/2003 | Wang .......................... 83/477.1 |
| 6,615,930 B2 | * | 9/2003 | Bongers-Ambrosius et al. ............................. 173/198 |
| 6,736,042 B2 | * | 5/2004 | Behne et al. ................. 83/440.2 |
| 6,792,878 B2 | | 9/2004 | Cheng |
| 6,802,266 B2 | | 10/2004 | Cheng |
| 6,823,907 B2 | | 11/2004 | Cheng |
| 7,182,150 B2 | * | 2/2007 | Grossman ..................... 173/198 |
| 7,216,572 B2 | * | 5/2007 | Keenan ........................... 83/100 |
| 7,354,226 B2 | * | 4/2008 | Britz .............................. 408/67 |
| 7,654,181 B2 | * | 2/2010 | Quinlan .......................... 83/100 |
| 7,661,195 B1 | * | 2/2010 | Wood et al. ..................... 30/392 |

(Continued)

FOREIGN PATENT DOCUMENTS

| | | | | |
|---|---|---|---|---|
| EP | 0775548 | * | 5/1997 | ............. B23D 59/00 |
| JP | 03-128203 | * | 5/1991 | ............... B27G 3/00 |

*Primary Examiner* — Laura M Lee
(74) *Attorney, Agent, or Firm* — Maginot, Moore & Beck

(57) ABSTRACT

A table saw includes a base assembly having a base structure and side walls, a table top assembly top surface, and an undercarriage assembly including a motor. The undercarriage assembly is configured to adjust the vertical and angular position of a blade relative to the table top assembly, and includes an undercarriage frame and cover together defining a narrow housing configured and sized to enclose substantially all of an installed blade under the top surface. The housing has an upper pivot for adjusting the angular position of the blade and is configured to have the motor slidably mounted therein to adjust the vertical position of the blade. A removable port structure attached to a bottom portion of the undercarriage assembly has an outlet port at an outer end that is configured to be connected to a vacuum source.

19 Claims, 7 Drawing Sheets

(56) References Cited

U.S. PATENT DOCUMENTS

| | | | |
|---|---|---|---|
| 8,161,652 B2* | 4/2012 | Delfini et al. | 30/124 |
| 2002/0025767 A1* | 2/2002 | Chen | 451/259 |
| 2009/0100682 A1* | 4/2009 | Delfini et al. | 30/124 |
| 2010/0248600 A1* | 9/2010 | Chianese et al. | 451/453 |
| 2010/0307308 A1* | 12/2010 | Butler | 83/100 |
| 2012/0036972 A1* | 2/2012 | Frolov | 83/168 |

* cited by examiner

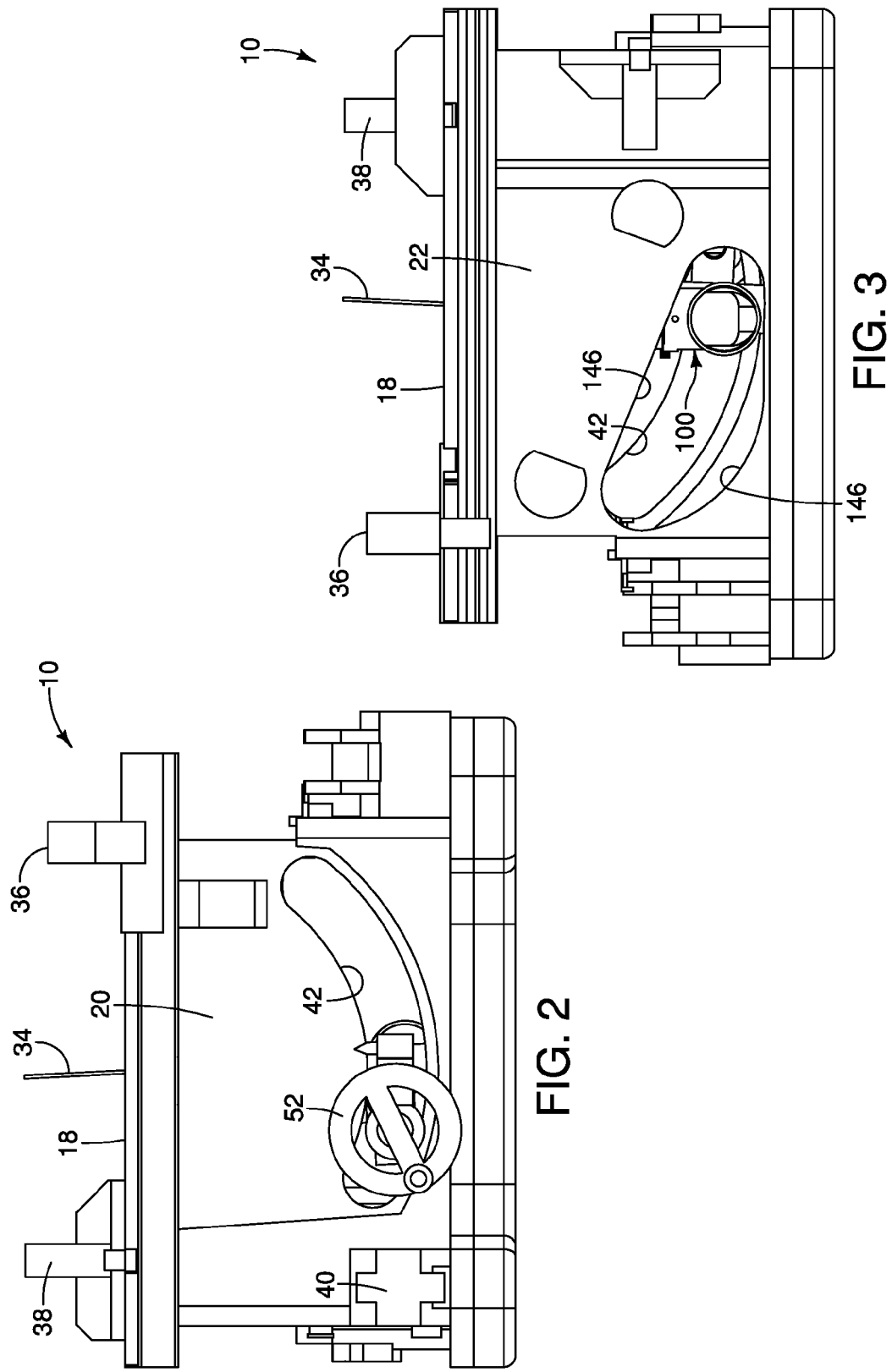

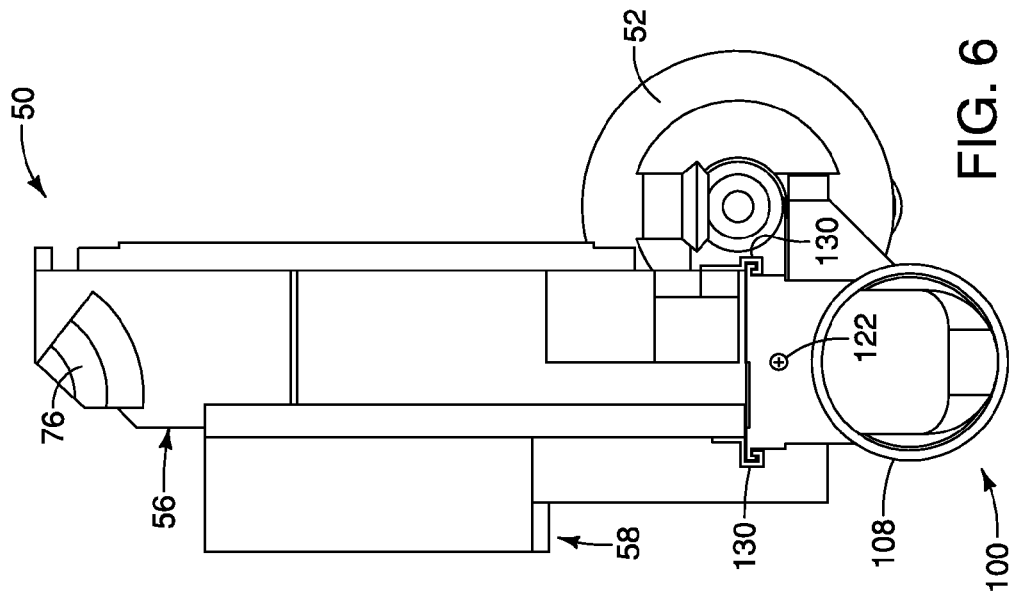
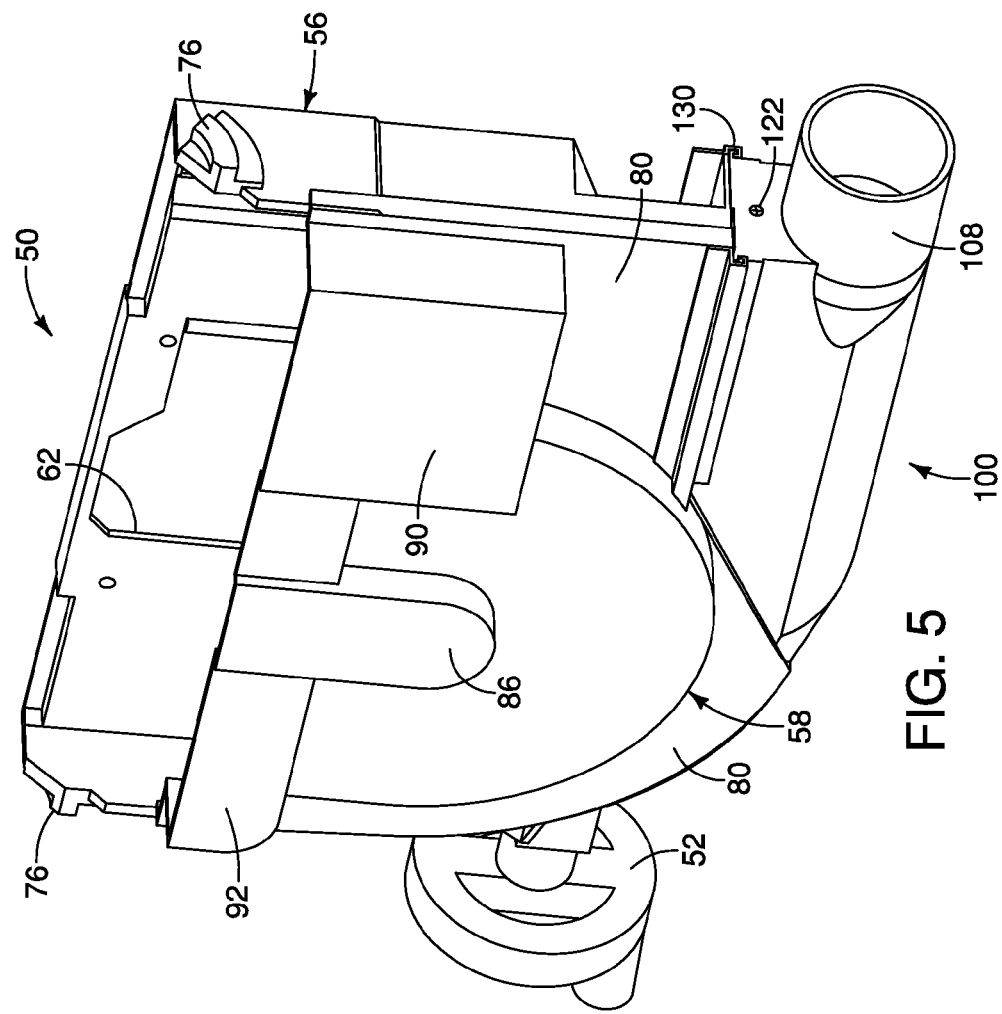

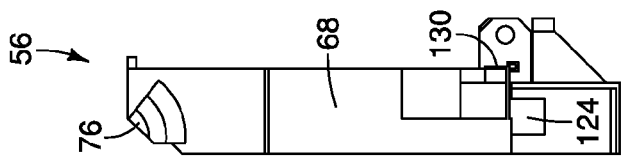
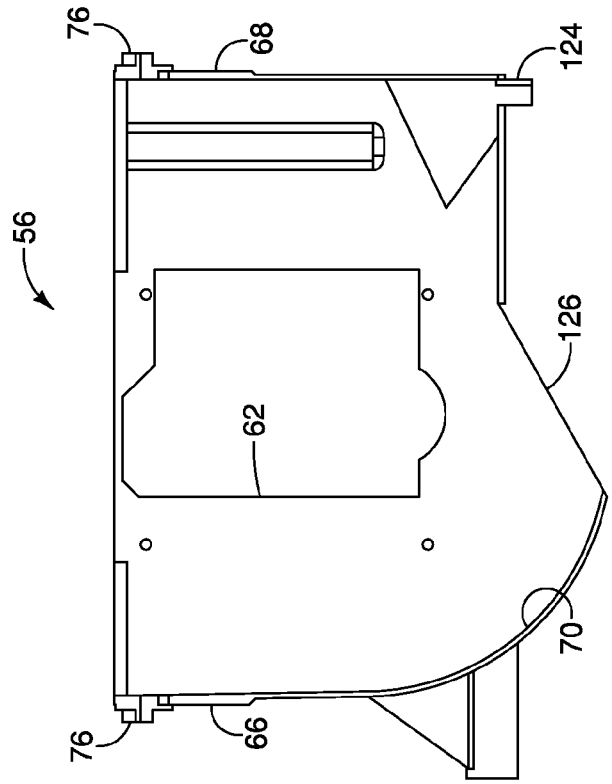
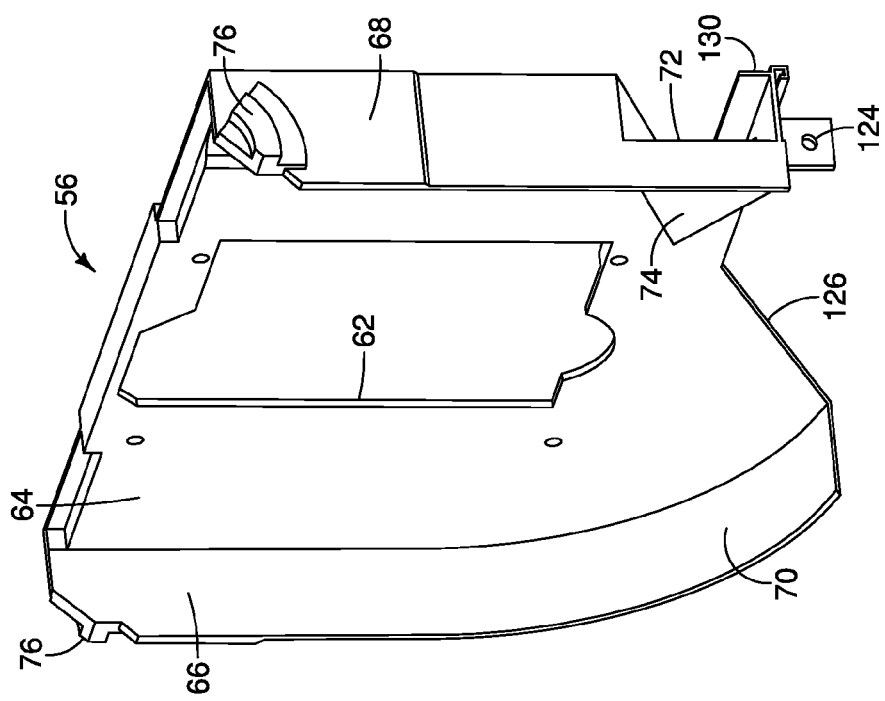

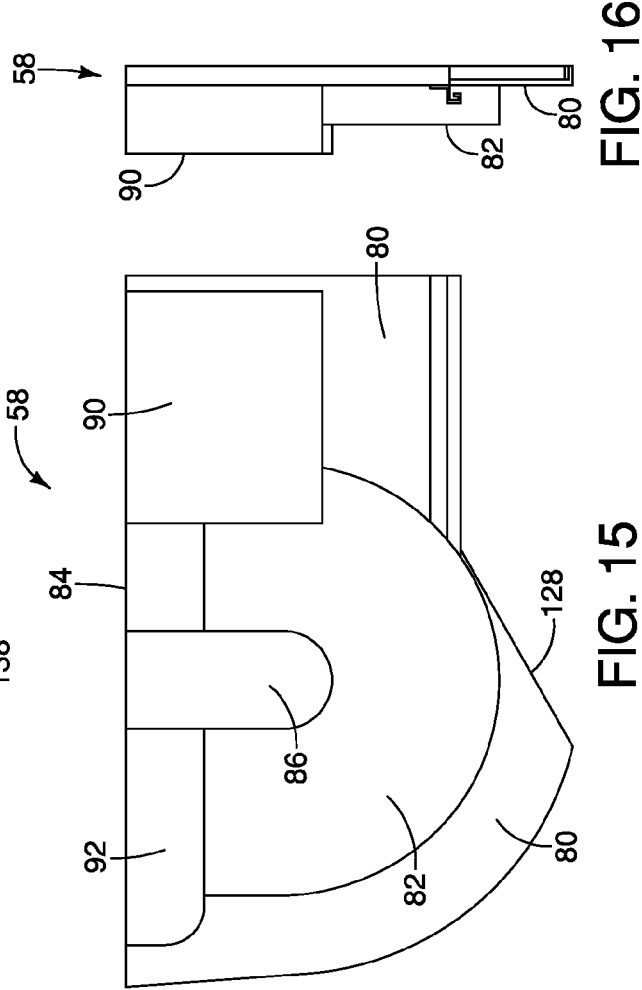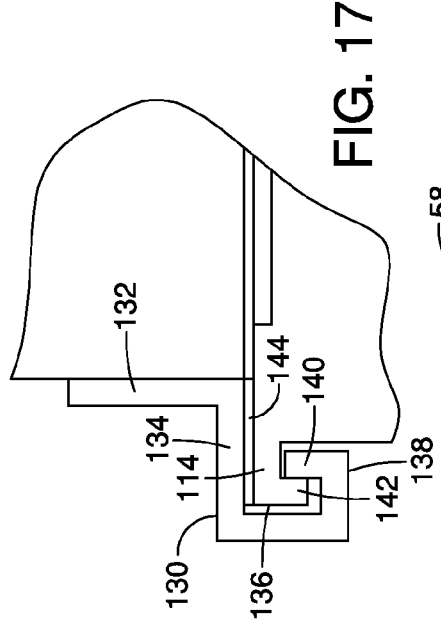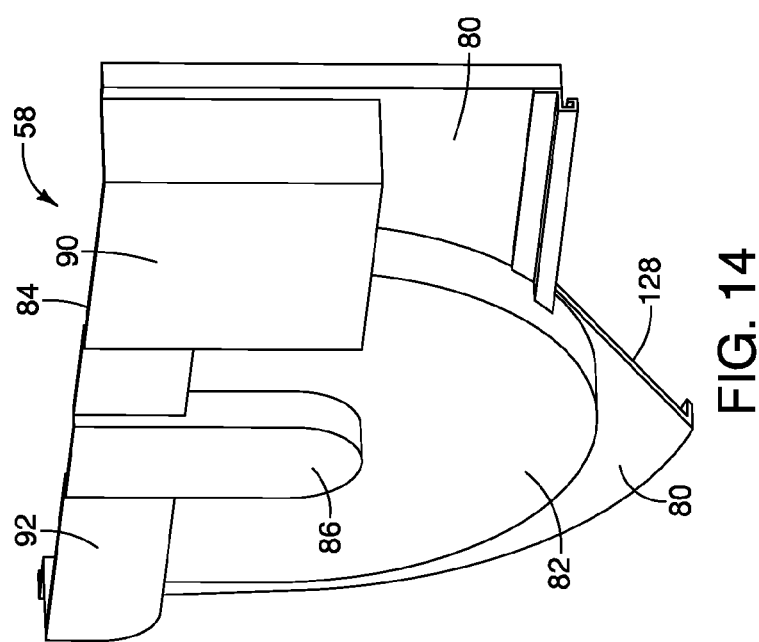

US 8,770,074 B2

POWER SAW HAVING A DUST CLEANING SYSTEM

BACKGROUND OF THE INVENTION

The present invention generally relates to power tools and, more particularly, to power table saws.

Most power table saws that are currently commercially available have an undercarriage assembly which permits vertical as well as angular adjustability of a driven blade that extends through an opening in the table top. Such adjustability enables the height of the blade to be controlled for making safe and accurate cuts on a work piece by the table saw, and the angular adjustability permits the blade to be positioned to provide bevel cuts on a work piece.

While many table saws have a dust port which is configured to be connected to a vacuum system, which typically includes a flexible tube that extends to a source of vacuum, such as a commercially available wet and/or dry vacuum device that is mounted on a barrel-type container, for example. While such a dust port can evacuate a substantial amount of dust and debris that is produced during operation of the table saw, the volume underneath of the table top may not be entirely removed of debris, particularly larger pieces thereof that are not effectively entrained in the airflow that is being removed by operation of the vacuum source. Thus, such dust and debris may accumulate in the bottom of the saw which needs to be cleaned up.

Some table saws have an opening in a rear panel of the saw for gaining access to the material that may be accumulated on the bottom of the base assembly. However, it is sometimes necessary to turn the saw on its side or even upside down in order to effectively remove all of the material that has been accumulated. It is also sometimes necessary for a bottom cover to be removed in order to access the interior of the table saw for clean up. These latter actions are often inconvenient and time-consuming to complete.

SUMMARY OF THE INVENTION

Embodiments of the invention are directed to table saw comprising: a base assembly having a base structure and generally vertical front, back, left and right side walls, and being configured to retain an undercarriage assembly for driving a rotatable blade; a table top assembly supported by the base assembly and having a top surface with a opening through which the rotating blade can extend; an undercarriage assembly including a motor, the undercarriage assembly being mounted to the table top assembly and being configured to adjust the vertical and angular position of the blade relative to the table top assembly, the undercarriage assembly further comprising: an undercarriage frame and cover together defining a narrow housing configured and sized to enclose substantially all of an installed blade except a top portion thereof when the undercarriage assembly is in a retracted vertical position, the frame having an upper pivot connection for adjusting the angular position of the blade and being configured to have the motor slidably mounted therein to adjust the vertical position of the motor and blade; and a removable port structure attached to a bottom portion of the undercarriage assembly, the port structure having an elongated body with side walls and a bottom wall defining a receiving chamber with an open upper portion communicating with the inside of the housing and an outlet port at an outer end configured to be connected to a vacuum source.

DESCRIPTION OF THE DRAWINGS

FIG. 2 is a front plan view of the table saw shown in FIG. 1;

FIG. 3 is a rear plan view of the table saw shown in FIG. 1;

FIG. 5 is a right rear perspective of the undercarriage assembly shown in FIG. 4;

FIG. 6 is a rear view of the undercarriage assembly shown in FIG. 4;

FIG. 11 is a right rear perspective of a portion of the undercarriage assembly shown in FIGS. 4 and 5;

FIG. 12 is a right plan view of the portion shown in FIG. 11;

FIG. 13 is a front plan view of the portion shown in FIG. 11;

FIG. 14 is a right rear perspective of another portion of the undercarriage assembly that cooperates with the portion shown in FIGS. 11-13;

FIG. 15 is a right plan view of the portion shown in FIG. 14;

FIG. 16 is a rear end view of the portion shown in FIG. 14; and

FIG. 17 is a detailed end view of a portion of the structure of FIG. 6, with a modified embodiment showing a seal structure.

DETAILED DESCRIPTION

Figure 1:
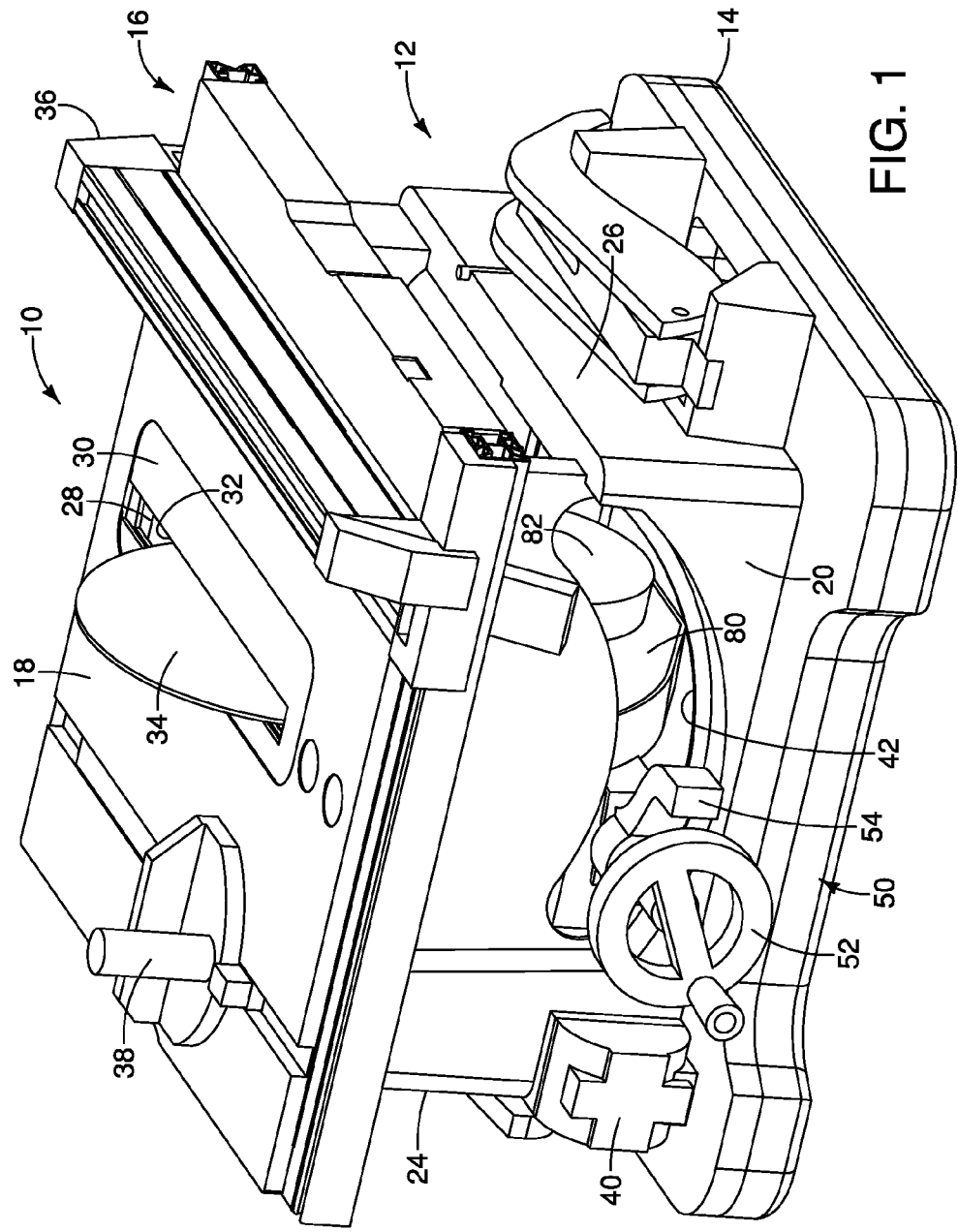
FIG. 1 is a front right perspective isometric view of a portable table saw illustrating a preferred embodiment of the present invention.

The embodiments of the present invention are directed to a power saw having a dust cleaning system which effectively contains and removes dust and debris that is generated during operation of the saw. The system removes dust and debris through an outlet port that is configured to be connected to a vacuum source. The system provides containment of the dust and debris within a housing that is part of the undercarriage assembly of the saw and the outlet port is a part of a removable port structure that mates with the housing. The port structure preferably connects to a bottom portion of the housing structure and is in the form of a scoop that is configured to receive accumulated dust and debris, and the scoop can be easily removed to be emptied into a suitable waste container and then be reinstalled in the undercarriage assembly. While embodiments of the present invention are particularly suited to a conventional permanent or portable table saw where the work piece is moved past the blade during cutting, it is also suited for use with a push/pull type of saw that is prevalent in European markets, as well as other types of saws wherein a rotating blade or the like may be driven with an undercarriage assembly.

Turning now to the drawings, a power table saw is indicated generally at 10, and has a base assembly, indicated generally at 12, a base structure 14 and a table top assembly, indicated generally at 16, which has a table top surface 18. The base assembly 12 has generally vertical walls, including front wall 20, rear wall 22, and left and right side walls, 24 and 26, respectively. The table top assembly 16 has an opening 28 in which a blade access insert 30 fits, with the insert 30 having an elongated slot 32 through which a blade 34 extends. The saw assembly also preferably includes a rip fence 36, a miter fence 38 and a power switch 40.

These general components are typical of portable table saws that can be easily transported to a jobsite where they can be used in conjunction with construction, remodeling and similar projects. While it is important that they be relatively lightweight so that a craftsman can carry them from their vehicles to the location where they will be used on a jobsite without difficulty, it is also important that they be designed and constructed so that they can withstand the inevitable wear and tear that they are subjected to at a construction or similar jobsite.

The front wall 20 includes an arcuate slot 42 that is provided to enable portions of an undercarriage assembly, indicated generally at 50, to extend outside of the base assembly for the purpose of manipulating the height of the blade 34 that extends above the top surface 18 of the table top assembly 16, as well as the control for adjusting the angle of the blade 34. As shown in FIGS. 1-3, the blade 34 is shown substantially perpendicular to the plane of the table top 18 and the undercarriage assembly 50 is configured to enable the blade to be vertically adjusted, typically to a lowered position wherein the upper reach of the blade 34 is approximately even with the surface 18, although the full extent of the vertical adjustability is also a function of the diameter of the blade 34.

Figure 4:
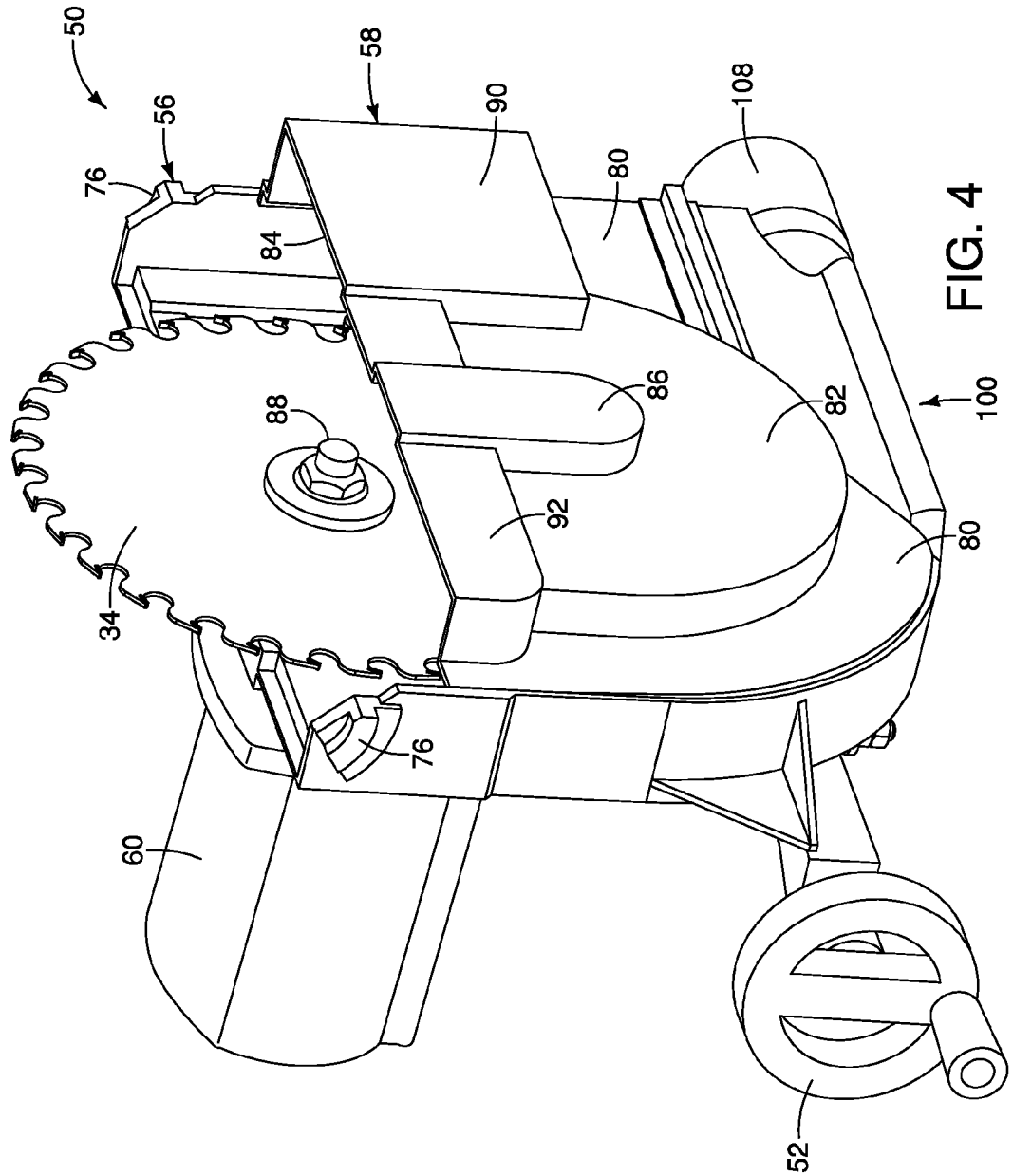
FIG. 4 is a right front perspective view of a portion of an undercarriage assembly that forms a part of the table saw of FIG. 1.
Figure 8:
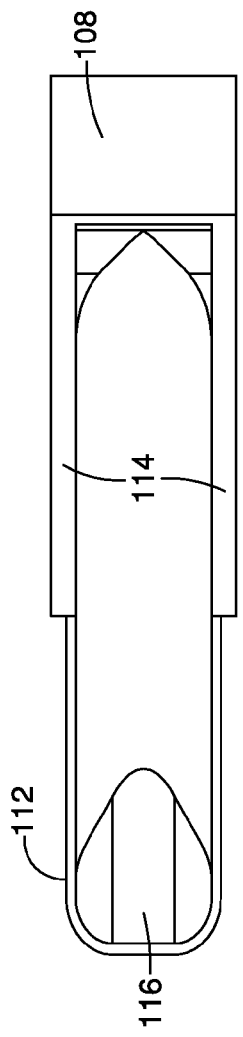
FIG. 8 is a top view of the port structure shown in FIG. 7.
Figure 9:
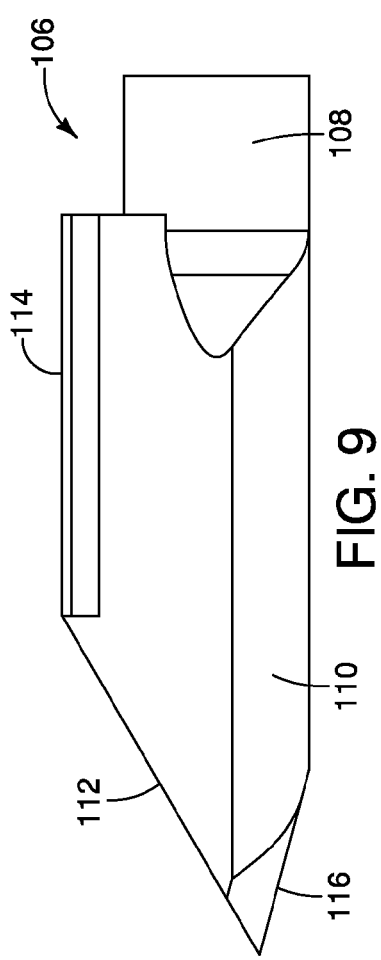
FIG. 9 is a right side plan view of the port structure shown in FIG. 7.
Figure 10:
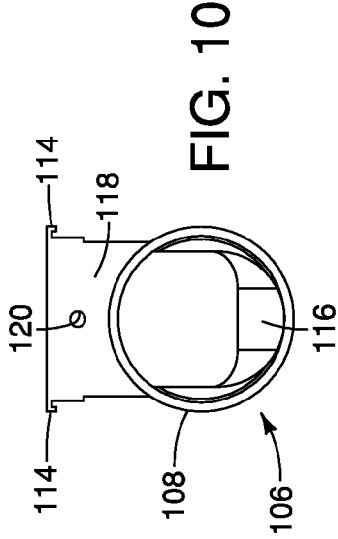
FIG. 10 is a rear view of the port structure shown in FIG. 7.
Figure 7:
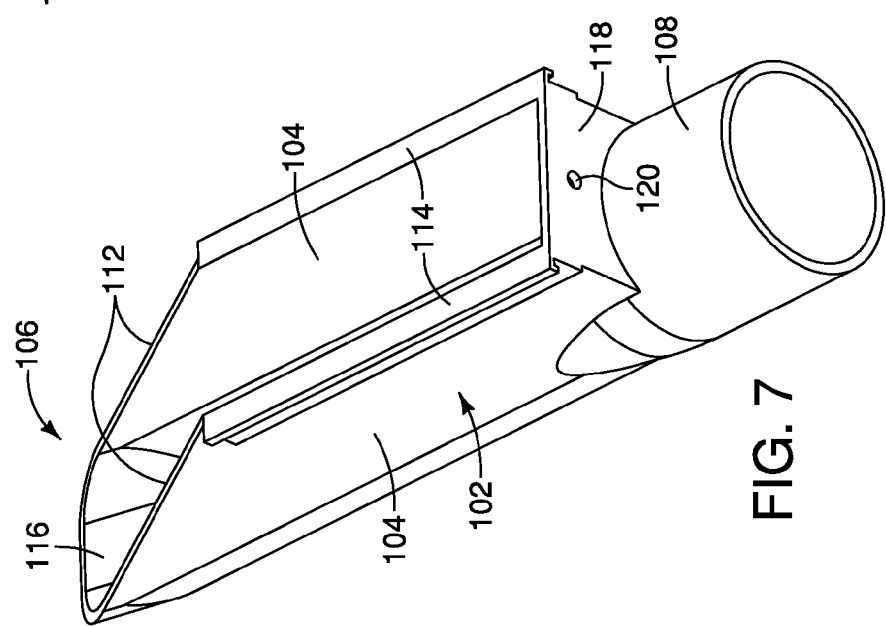
FIG. 7 is a right rear elevated perspective of a removable port structure that is a part of the undercarriage assembly shown in FIG. 4.

The undercarriage assembly 50 is shown separately in FIGS. 4, 5 and 6, and has a hand crank 52 that can be rotated in one direction to raise the elevation of the blade 34 and in the opposite direction to lower it. A separate lever 54 controls a releasable lock that enables the undercarriage assembly to be rotated around a pivot point to adjust the angle of the blade 34. As shown in FIG. 1, the entire mechanism 50 can be rotated along the length of the slot 42 (to the right as shown in the drawing) which will cause the blade 34 to be tilted to the left, with the amount of tilting generally being limited to approximately 45°. The size of the slot 42 need only be slightly larger than is necessary for the mechanism to have clearance for the necessary pivoting movement.

Turning particularly to FIGS. 4-6, the undercarriage assembly 50 has a frame member, indicated generally at 56, and a cover member, indicated generally at 58, which together form a narrow housing that substantially encloses the blade 34. The undercarriage assembly 50 carries a motor 60 which is mounted on a movable plate mechanism (not shown), but which fits within an opening in the frame 56. The frame 56 is separately illustrated in FIGS. 11-13 and includes a main side wall 64 in which the opening 62 is located. The frame 56 has end wall portions 66 and 68 which are preferably integrally formed with the side wall 64.

The end wall 66 has a curved lower portion 70 that extends to the bottom thereof, with the curvature generally corresponding to the curvature of the largest blade 34 that the saw will be designed to accept. The opposite wall 68 extends generally in a straight direction downwardly to a portion 72 that forms an inwardly extending wedge 74 that extends approximately slightly more than one-half of the width of the end wall 68. The wedge 74 is designed to have a width that does not interfere with the blade 34, but provides a desirable boundary or barrier for directing air produced by rotation of the blade 34 to create an airflow that is desirable for expelling saw dust and other material produced during operation of the saw.

To achieve the angular adjustment of the undercarriage assembly, the frame 56 has a pair of arcuate raised pivot portions 76, one located at the upper end of wall 66 and the other at the upper end of the end wall 68. These pivot portions 76 engage a cooperatively shaped bracket (not shown) provided on the underside of the table top assembly and act as pivot points for the undercarriage assembly 50.

The cover 58 is shown in the drawings of the undercarriage assembly 50 shown in FIGS. 4-6 and also separately in FIGS. 14-16. The cover 58 has stepped thicknesses, with a main planar portion 80 which has approximately the identical outer peripheral shape and size so to be able to engage the end walls 66 and 68 of the frame 56. The cover has a raised semi-circular portion 82 that extends upwardly to a top surface 84. A further raised elongated portion 86 also having a semi-circular bottom end is provided and it is coextensive with an arbor 88 (see FIG. 4) on which the blade 34 is mounted.

The elongated portion 86 provides the necessary clearance for the arbor bolt 88 so that the motor 60 and blade 34 can be raised and lowered as previously described. The outside diameter of the semi-circular portion 82 is preferably larger than the diameter of the blade 34. Additional box-shaped portions 90 and 92 provide clearance for accessing the arbor net and for providing a larger entrance mounted in the event that the insert 30 is removed. The surface 84 is lower than the corresponding top surface of the frame 56 so that when the undercarriage assembly 50 is pivoted about the pivot 76, the cover 58 will not interfere with the underside of the table top assembly 16 when angularly adjusted to its maximum angle of about 45 degrees.

A removable port structure, indicated generally at 100, is shown in FIGS. 4-10, which is configured to be slidably removable from the frame 56 and cover 58. The port structure 100 has an elongated body portion 102 with side walls 104 that extend to an inner end portion, indicated generally at 106. The port structure also has a cylindrical outer outlet port 108 that is configured to be connected to a flexible conduit that extends to a source of vacuum. The elongated body portion 102 has a curved bottom portion 110 which together with the side walls 104 have a cross-sectional configuration in the shape of a U. The elongated body has a curved bottom portion 110 which together with the side walls have a cross sectional configuration in the shape of a U. The interior of the elongated body portion 102 forms a chamber for retaining pieces of debris that are not expelled by the vacuum forces or caked saw dust and the like may be accumulated therein.

The inner end 106 has an inclined top surface 112 that extends from a pair of outwardly extending flanges 114 that are formed on the top of the side walls 104 of the body portion 102. The inner end 116 of the inner end portion 106 is gently curved upwardly to generally conform to the curvature of the curved portion 70 of the frame 56. A bulkhead wall 118 is provided at the outer end of the elongated body portion 102 where the elongated body portion merges with the outlet port 108. The bulkhead wall 118 preferably has an aperture 120 for receiving a fastener such as a screw or the like 122 (see FIG. 5). The screw 122 is configured to engage an aperture in a downwardly extending tab 124 of the frame 56 for holding the port structure 100 in its installed position. The side wall 64 of the frame 56 has a similarly angled inclined surface 126 that mates with the surface 112 of the port structure and the cover 58 also has a similarly angled inclined surface 128 which also mates with the inclined surface 112 of the port structure 100.

The cover 58, as well as the frame 56, has a bracket 130 which is configured to receive the flanges 114 in sliding engagement to install and remove the port structure 100 from the frame 56 and cover 58 portions of the undercarriage assembly 50. As shown in the detail of FIG. 17, the bracket has an upper wall 132 that is connected to either the cover or frame structure and it has a horizontal portion 134, a downward leg 136, a return leg 138 and a small vertical extension 140. The flange 114 is shown to have a small downward end portion 142. While it is preferred that the bracket enclose the flange 114 to provide a tight seal that prevents sawdust from exiting the undercarriage assembly at the interface between the port structure and the frame and cover construction, it should be understood that other configurations than that shown in the drawings may be used. It should be understood that while the brackets 130 are shown to be separately attached to either the cover or frame, it is possible for the brackets 130 to be integrally formed, if desired. Moreover, a rubber or other sealing material layer 144 may be provided for inhibiting leakage of dust at the interface of the port structure 100 relative to the frame and cover combination. Additionally, it is possible that a seal be provided at the interface between the surface 112 of the port structure 100 and either the inclined surfaces 126 and 128.

The port structure 100 is configured to be easily removed from the undercarriage assembly 50 and to that end, the back wall 22 has an opening 146 therein which is larger than the opening 42 in the front wall 20. This opening 146 is sized to enable the port structure 100 to be disconnected from the frame 56 and cover 58 combination to empty the dust and other debris that may have accumulated in the port structure. While the view of FIG. 3 shows the undercarriage assembly 50 in position so that the blade 34 is perpendicular to the top surface 18, it may be necessary to rotate the undercarriage assembly 50 a small distance so that the port structure 100 is aligned toward the middle of travel of the undercarriage assembly 50 where there is a greater distance between the top and bottom portions of the opening 146.

Since the screw 122 is in plain sight and is easily accessible to a user having a screwdriver, the screw can be disengaged from the opening in the tab 124 of the frame 56 and the port structure can then be merely pulled out and emptied. It may be preferred that the screw 122 have a retaining clip or the like so that while it may disengage the aperture in the tab 124, it will be held captive in the port structure 100 so that it will not be lost or dropped into the interior of the saw when the port structure 100 is removed from the saw.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention.

Various features of the invention are set forth in the following claims.

What is claimed is:

1. A table saw comprising:
    a base assembly having a base structure and generally vertical front, back, left and right side walls, and being configured to retain an undercarriage assembly for driving a rotatable blade;
    a table top assembly supported by said base assembly and having a top surface with an opening through which the rotating blade can extend;
    an undercarriage assembly including a motor, said undercarriage assembly being mounted within said base assembly and below to said table top assembly and being configured to adjust the vertical and angular position of the blade relative to said table top assembly, said undercarriage assembly further comprising:
        an undercarriage frame and cover positioned within said base assembly and including a plurality of side walls that are connected to form a narrow housing within the base assembly configured and sized to surround an installed blade, the side walls including upper portions and lower portions, the upper portions defining an open top for the narrow housing from which the blade can extend to the opening in the top surface of the table top assembly, the lower portions defining an open bottom directly under at least a portion of the blade, said frame having an upper pivot connection for adjusting the angular position of the blade and being configured to have said motor slidably mounted therein to adjust the vertical position of the motor and blade; and
        a removable port structure received within said base assembly and removably attached to said housing, said port structure having an elongated body that extends across said open bottom of said narrow housing under said blade and includes a bottom wall and side walls that extend upwardly from a perimeter of the bottom wall to the lower portions of the side walls of the housing to enclose said open bottom of said housing, said bottom wall and said side walls of said port structure defining a receiving chamber with an open upper portion communicating with the inside of said housing, said elongated body including an outlet port in communication with said receiving chamber and configured to be connected to a vacuum source;
    wherein said elongated body of said port structure is configured to collect dust and debris which may accumulate within said housing when said motor is not operational,
    wherein said undercarriage assembly has a pair of spaced apart elongated support surfaces configured to engage a pair of complementary rails of said port structure, said port structure being selectively slidably attachable and removable from said undercarriage assembly, and
    wherein said port structure has an elongated rail on each side of said elongated body which is configured to engage said support surfaces of said undercarriage assembly.

2. A table saw as defined in claim 1 wherein said port structure has a generally U-shaped cross section along said elongated body.

3. A table saw as defined in claim 1 wherein said support surfaces are provided by a pair of brackets attached to said undercarriage frame and cover.

4. A table saw as defined in claim 3 wherein each of said rails comprise an elongated flange extending outwardly from a top portion of said side walls of said port structure.

5. A table saw as defined in claim 4 wherein each of said brackets is configured to enclose the top, the side and at least a portion of the bottom surface of said elongated flange.

6. A table saw as defined in claim 1 wherein said port structure has an inner end portion that extends from said elongated body and has downwardly inclined side walls extending from said elongated body to an inner end surface thereof, said inner end portion being configured to abut complementarily inclined portions of said undercarriage frame and cover.

7. A table saw as defined in claim 1 wherein said upper pivot connection connects said undercarriage frame and cover to said table top assembly.

8. A table saw as defined in claim 1 wherein said narrow housing is pivotable about said upper pivot connection for adjusting the angular position of the blade through a predetermined arc, and said base assembly back wall has an opening therein that is configured to be generally coextensive with the outlet of said port structure through said predetermined arc, thereby enabling an external vacuum source conduit to be connected to said outlet port substantially throughout said angular positions of the blade.

9. A table saw as defined in claim 8 wherein said predetermined arc is within the range of the blade being perpendicular to said table top surface and an angle of about 45 degrees relative to said table top surface.

10. A table saw as defined in claim 9 wherein said opening in said base assembly back wall has the shape of an arcuate slot having a width slightly larger than the diameter of said outlet port and a length at least coextensive with said predetermined arc.

11. A table saw as defined in claim 9 wherein said opening in said base assembly back wall has the shape of an arcuate slot concentric with said upper pivot connection, and having a width sufficient to permit said port structure to be removed from said saw through said opening and a length at least coextensive with said predetermined arc.

12. A table saw as defined in claim 11 wherein said width of said opening in said base assembly back wall is sufficient to permit said port structure to be removed from said saw through said opening without appreciably changing the angular position of said port structure during removal.

13. A table saw as defined in claim 1 wherein said port structure comprises a bulkhead located at an interface between said outlet port and said elongated body, said outlet port comprising a cylindrical extension and communicating with said receiving chamber through an opening in said bulkhead.

14. A table saw as defined in claim 13 wherein said housing having a support surface extending into said receiving chamber adjacent said bulkhead configured to receive a connecting device operatively connected to said port structure for removably holding said port structure to said housing.

15. A table saw as defined in claim 14 wherein said connecting device comprises a screw extending through said bulkhead and engaging said support surface.

16. A table saw as defined in claim 1 further comprising a sealing member positioned at an interface between said housing and said port structure for preventing dust and debris from exiting said chamber through said interface.

17. A table saw as defined in claim 1 further comprising a gasket for sealing the interface between said rails and said support surfaces of said undercarriage assembly.

18. A table saw comprising:
- a base assembly having a base structure and generally vertical front, back, left and right side walls, and being configured to retain an undercarriage assembly for driving a rotatable blade;
- a table top assembly supported by said base assembly and having a top surface with a opening through which the rotating blade can extend;
- an undercarriage assembly including a motor, said undercarriage assembly being mounted to said table top assembly and being configured to adjust the vertical and angular position of the blade relative to said table top assembly, said undercarriage assembly further comprising:
  - a narrow undercarriage housing positioned within said base assembly configured and sized to surround an installed blade below the top surface of said table top assembly, said housing having an open top from which the blade can extend to the opening in the top surface of the table top assembly and an open bottom positioned directly under at least a portion of the blade, said housing having an upper pivot connection for adjusting the angular position of the blade and being configured to have said motor slidably mounted therein to adjust the vertical position of the motor and blade; and
  - a scoop removably received within said base assembly and attached to said housing over said open bottom such that it extends under said blade, said scoop having an outlet port in communication with an inside of said housing through said scoop, said outlet port being configured to be connected to a vacuum source;
- wherein said scoop is configured to collect dust and debris which may accumulate within said housing when said motor is not operational,
- wherein said scoop has an elongated body with side walls and a bottom wall defining a receiving chamber with an open upper portion communicating with the inside of said housing, and
- wherein said scoop has elongated rails on opposite sides thereof that cooperatively attach to structure of said housing so that said scoop can be selectively slidingly removed and attached to said housing.

19. A table saw as defined in claim 18 wherein said back wall has an opening therein that is sized and configured to enable an external vacuum source conduit to be connected to said outlet port substantially throughout said angular positions of the blade, and to enable said scoop to be removed from said housing through said opening in said back wall.

* * * * *